(12) United States Patent
Bryne

(10) Patent No.: US 10,759,491 B2
(45) Date of Patent: Sep. 1, 2020

(54) CLEAT ASSEMBLY FOR CLIPLESS BICYCLE PEDAL

(71) Applicant: Speedplay, Inc., San Diego, CA (US)

(72) Inventor: Richard M. Bryne, San Diego, CA (US)

(73) Assignee: Wahoo Fitness L.L.C., Atlanta, GA (US)

( * ) Notice: Subject to any disclaimer, the term of this patent is extended or adjusted under 35 U.S.C. 154(b) by 0 days.

(21) Appl. No.: 16/236,199

(22) Filed: Dec. 28, 2018

(65) Prior Publication Data
US 2019/0168843 A1  Jun. 6, 2019

Related U.S. Application Data

(63) Continuation of application No. 14/475,248, filed on Sep. 2, 2014, now Pat. No. 10,279,862.

(51) Int. Cl.
*B62M 3/08* (2006.01)

(52) U.S. Cl.
CPC .................................. *B62M 3/086* (2013.01)

(58) Field of Classification Search
CPC ........ B62M 3/086; B62M 3/083; B62M 3/08; A64B 5/14; A64B 5/18; Y10T 74/217; Y10T 74/2168
See application file for complete search history.

(56) References Cited

U.S. PATENT DOCUMENTS

| | | |
|---|---|---|
| 1,370,730 A | 3/1921 | Calrow |
| 3,808,910 A | 5/1974 | Desbois |
| 3,859,867 A | 1/1975 | Haines |
| 4,055,005 A | 10/1977 | Meinhart |
| 4,298,210 A | 11/1981 | Lotteau |

(Continued)

FOREIGN PATENT DOCUMENTS

| | | |
|---|---|---|
| CN | 101801780 A | 8/2010 |
| CN | 101801780 A | 8/2010 |

(Continued)

OTHER PUBLICATIONS bont.com, Bont Crono, www.bont.com/cycling/pages/bontcrono.html.

(Continued)

*Primary Examiner* — Daniel D Yabut
(74) *Attorney, Agent, or Firm* — Harness, Dickey & Pierce, P.L.C.

(57) ABSTRACT

An improved cleat assembly configured to be releasably secured to a clipless bicycle pedal comprises a first plate, a second plate disposed over the first plate, and plurality of spacers disposed between the first and second plates, the spacer separating the first and second plates a predetermined distance. The second plate may define a pedal aperture having a circumferential periphery comprising a first portion and a side tie portion and the side tie portion may be offset from the first portion. The cleat assembly may further comprise a cap disposed over at least the second plate wherein the second plate may comprise a first of an engagement pair and the cap may comprise a second of the engagement pair. The first and second of the engagement pair may cooperate to couple the cap and the second plate to affix the cap onto the cleat assembly.

17 Claims, 8 Drawing Sheets

(56) References Cited

U.S. PATENT DOCUMENTS

| | | | |
|---|---|---|---|
| 4,488,453 A | 12/1984 | Drugeon | |
| 4,599,914 A | 7/1986 | Dunn | |
| 4,599,915 A | 7/1986 | Hlavac | |
| 4,735,107 A | 4/1988 | Winkie | |
| 4,739,564 A | 4/1988 | Eser | |
| 4,803,894 A | 2/1989 | Howell | |
| 4,815,333 A | 3/1989 | Sampson | |
| 4,819,504 A | 4/1989 | Sampson | |
| 4,827,633 A | 5/1989 | Feldstein | |
| 4,827,797 A | 5/1989 | Le | |
| 4,840,086 A | 6/1989 | Bidal | |
| 4,898,063 A | 2/1990 | Sampson | |
| 4,899,618 A | 2/1990 | Christol | |
| 4,936,164 A | 6/1990 | Forke | |
| 4,942,778 A | 7/1990 | Bryne | |
| 5,007,185 A | 4/1991 | Lazarski | |
| 5,031,342 A | 7/1991 | Crook | |
| 5,079,968 A | 1/1992 | Starner | |
| 5,199,192 A * | 4/1993 | Kilgore | A43B 5/14 36/131 |
| 5,199,324 A | 4/1993 | Sain | |
| 5,213,009 A * | 5/1993 | Bryne | B62M 3/086 74/594.4 |
| 5,284,066 A | 2/1994 | Weiss | |
| 5,321,995 A | 6/1994 | Zedan | |
| 5,325,738 A | 7/1994 | Bryne | |
| 5,363,573 A | 11/1994 | Kilgore | |
| 5,371,903 A | 12/1994 | Lew | |
| 5,406,647 A | 4/1995 | Lew | |
| 5,546,829 A | 8/1996 | Bryne | |
| 5,553,516 A | 9/1996 | Weiss | |
| 5,557,985 A | 9/1996 | Nagano | |
| 5,575,184 A | 11/1996 | De | |
| 5,606,894 A | 3/1997 | Bryne | |
| 5,657,558 A | 8/1997 | Pohu | |
| 5,687,619 A | 11/1997 | Bryne | |
| 5,697,262 A | 12/1997 | Chen | |
| 5,727,429 A | 3/1998 | Ueda | |
| 5,765,450 A | 6/1998 | Kruger | |
| 5,778,739 A | 7/1998 | Takahama | |
| 5,784,931 A | 7/1998 | Ueda | |
| 5,806,379 A | 9/1998 | Nagano | |
| 5,852,955 A | 12/1998 | Crisick | |
| 5,860,330 A | 1/1999 | Code | |
| 5,862,716 A | 1/1999 | Bryne | |
| 5,878,514 A * | 3/1999 | Ueda | A43B 5/14 36/131 |
| 5,916,332 A | 6/1999 | Chen | |
| D413,711 S | 9/1999 | Hicks, Jr. | |
| 6,003,408 A | 12/1999 | Hervig | |
| 6,014,914 A | 1/2000 | Ueda | |
| 6,070,493 A | 6/2000 | Chen | |
| 6,128,973 A | 10/2000 | Nagano | |
| 6,151,989 A | 11/2000 | Ueda | |
| 6,205,885 B1 | 3/2001 | Hermansen | |
| 6,230,584 B1 | 5/2001 | Lin | |
| 6,244,136 B1 | 6/2001 | Chen | |
| 6,309,010 B1 | 10/2001 | Whitten | |
| 6,425,304 B1 | 7/2002 | Bryne | |
| 6,446,529 B1 | 9/2002 | Tanaka | |
| 6,453,771 B1 | 9/2002 | Takahama | |
| 6,490,948 B2 | 12/2002 | Tanaka | |
| 6,494,117 B1 | 12/2002 | Bryne | |
| 6,581,493 B1 | 6/2003 | Gillane | |
| D481,974 S | 11/2003 | Evans | |
| 7,013,754 B2 | 3/2006 | Milanowski | |
| 7,017,445 B2 | 3/2006 | Bryne | |
| 7,174,807 B2 | 2/2007 | Bryne | |
| 7,322,259 B2 | 1/2008 | De | |
| 7,383,646 B2 | 6/2008 | Hall | |
| 7,472,498 B2 | 1/2009 | Bryne | |
| D595,620 S | 7/2009 | Kingsbury | |
| 7,779,560 B2 | 8/2010 | Kay | |
| 7,856,905 B2 | 12/2010 | Hsieh | |
| 7,877,904 B2 | 2/2011 | Bryne | |
| 8,272,150 B2 | 9/2012 | Bryne | |
| 8,387,287 B2 | 3/2013 | Kay | |
| D683,665 S | 6/2013 | Smith | |
| 2001/0008093 A1 | 7/2001 | Heim | |
| 2002/0144569 A1 | 10/2002 | Tanaka | |
| 2003/0051576 A1 | 3/2003 | Muraoka | |
| 2004/0187635 A1 | 9/2004 | Bryne | |
| 2004/0237705 A1 | 12/2004 | Conarro | |
| 2005/0155452 A1 | 7/2005 | Frey | |
| 2005/0252337 A1 | 11/2005 | Chen | |
| 2005/0284253 A1 | 12/2005 | Hervig | |
| 2006/0070489 A1 | 4/2006 | Chen | |
| 2006/0236809 A1 | 10/2006 | Bryne | |
| 2007/0084086 A1 | 4/2007 | Bryne | |
| 2007/0193402 A1 | 8/2007 | Hsieh | |
| 2010/0107451 A1 | 5/2010 | Kay | |
| 2010/0301632 A1 * | 12/2010 | Bryne | A43B 5/14 296/180.1 |
| 2011/0283568 A1 * | 11/2011 | Woodford | A43B 5/14 36/72 R |
| 2012/0103131 A1 | 5/2012 | Bryne | |
| 2012/0233891 A1 | 9/2012 | Woodford | |
| 2012/0285045 A1 | 11/2012 | Tsen | |

FOREIGN PATENT DOCUMENTS

| | | |
|---|---|---|
| DE | 2816189 A1 | 8/1979 |
| DE | 3315282 A1 | 10/1984 |
| DE | 3426103 A1 | 1/1986 |
| DE | 3149345 C2 | 1/1989 |
| DE | 202005019542 U1 | 2/2006 |
| EP | 0012097 A2 | 6/1980 |
| EP | 015803 A2 | 9/1980 |
| EP | 0106162 A1 | 4/1984 |
| EP | 153210 A1 | 8/1985 |
| EP | 155114 A2 | 9/1985 |
| EP | 0293340 A2 | 11/1988 |
| EP | 359134 A2 | 3/1990 |
| EP | 0485956 A1 | 5/1992 |
| EP | 516013 A2 | 12/1992 |
| EP | 0619219 A1 | 10/1994 |
| EP | 0826587 A1 | 3/1998 |
| EP | 0894446 A1 | 2/1999 |
| FR | 2279607 A1 | 2/1976 |
| FR | 2518041 A1 | 6/1983 |
| FR | 2609270 A1 | 7/1988 |
| FR | 2711963 A1 | 5/1995 |
| FR | 2775424 A1 | 9/1999 |
| FR | 2932450 A1 | 12/2009 |
| JP | S6423202 U | 2/1989 |
| JP | H05111402 A | 5/1993 |
| JP | H05076304U U | 10/1993 |
| JP | H11103902 | 4/1999 |
| JP | 200546629 | 2/2005 |
| JP | 2008536762 A | 9/2008 |
| JP | 2009511349 A | 3/2009 |
| JP | 2010533621 A | 10/2010 |
| JP | 2010263969 A | 11/2010 |
| TW | 368973 | 9/1999 |
| TW | 392662 | 6/2000 |
| TW | 200303278 A | 9/2003 |
| TW | M293881 | 7/2006 |
| TW | I308543 | 4/2009 |
| WO | 2004089741 A1 | 10/2004 |
| WO | WO-2009012042 A2 | 1/2009 |

OTHER PUBLICATIONS pearlizumi.com, PI Aero Lycra Shoe Cover, www.pearlizumi.com/product.pjp?mode=view&pc_id=50&product_id=193110.
Frog Pedal Specifications, www.speedplay.com.
Speedplay brochure.
International Search Report for International Application No. PCT/US2010/056057, dated Oct. 19, 2011.
International Preliminary Report on Patentability for International Application No. PCT/US2010/056057, dated May 7, 2013.
European Search Report for Application No. 13190753.7-1753, dated Dec. 12, 2013.

(56) References Cited

OTHER PUBLICATIONS

Office Action for Japanese Patent Application No. 2011-540875.
Office Action for CN Application No. 2015800468368; dated Aug. 27, 2018; 6 pages.
Office Action for CN Application No. 2015800468368; dated Jun. 10, 2019; 6 pages.
Office Action for JP Application No. 2017511901; dated Jun. 27, 2019; 5 pages.
Office Action for TW Application No. 104129052; dated Jun. 17, 2019; 5 pages.
International Search Report and Written Opinion for PCT Application No. PCT/US2015/047987; dated Jan. 29, 2016; 9 pages.
European Search Report and Opinion for EP Application No. 15838711; dated Mar. 21, 2018; 7 pages.
Examination Report for EP Application No. 15 338 711.8-1009; dated Apr. 7, 2020; 4 pages.
Office Action for JP Application No. 2017-511901; dated Mar. 4, 2020; 3 pages.

* cited by examiner

CLEAT ASSEMBLY FOR CLIPLESS BICYCLE PEDAL

CROSS-REFERENCE TO RELATED APPLICATION

The present application claims priority to U.S. application Ser. No. 14/475,248, filed on Sep. 2, 2014, the entire contents of which are incorporated by reference as if set forth herein.

FIELD OF THE INVENTION

The present invention relates generally to cleat assemblies configured for releasable securement to pedals for bicycles and the like, and, more particularly, to clipless bicycle cleat assemblies having improved durability, operation, and feel.

BACKGROUND

Footwear-mounted engagement methods have been used in cycling, skiing, snowboarding, rowing, and numerous other sports, to attach a user to a device for increased power and/or control.

Engagement of footwear-mounted cleats or cleat assemblies to bicycle pedals, in particular, have been notoriously difficult for a number of reasons. The cleat is mounted to the underside of a rider's shoe sole and is thus hidden from view. Likewise, the pedal assembly, being mounted to the underside of the rider's shoe sole, is also obscured from view by the shoe during the engagement process. Thus, engagement of a rider's shoe to a pedal assembly requires the rider to blindly align or engage the cleat to the pedal, relying primarily on tactile feedback and most typically while the rider is still in motion.

The tactile feedback experienced during engagement and disengagement of cleat assemblies to a pedal may change over time and use. Cleat assemblies are typically subjected to significant wear and tear during use and also when the user is simply walking around, as, the bottom most surface of the cleat assembly necessarily makes direct contact with the ground. Moreover, cleat assemblies may include multiple parts, typically made from various different materials having different material properties, which are coupled together. Over time and use, the material properties may change to alter the tactile feedback of the cleat assembly during engagement with and disengagement from the pedal.

BRIEF SUMMARY

It is desirable for bicycle cleat assemblies to substantially withstand the physical rigors during use and when the user is simply walking. As cleat assemblies are often constructed of multiple parts comprising various different materials exhibiting different physical characteristics such as strength, stiffness, elasticity, plasticity, ductility, malleability, hardness, brittleness, etc., it is important that the cleat assemblies do not change significantly so as to materially change the tactile feel during engagement with and disengagement from the bicycle pedal.

For example, it is preferable that the various parts that comprise a bicycle cleat assembly remain securely coupled to one another, such as by way of bolted joints, in order to reduce or eliminate sloppy feel, particularly while the bicycle cleat assembly is releasably secured to a bicycle pedal and during the pedal engagement and disengagement process. Tightening attachment screws will apply varying degrees of clamping force to any intervening components of the bolted joints of the bicycle cleat assembly. If intervening components in a bolted joint comprise a deformable material (i.e., elastomeric materials, plastic, and other similar types of materials), repeated tightening of the attachment screws may be required because the aforementioned intervening components can deform over time in response to the resulting clamping force. The intermediate plate can also comprise a substantially non-deformable material such as metal alloy or a combination of deformable and non-deformable materials.

In one embodiment, a cleat assembly configured to be releasably secured to a clipless bicycle pedal is described. The cleat assembly comprises a first plate, a second plate shaped to be disposed over the first plate, and a plurality of spacers configured to be disposed between the first and second plates. The second plate defines a first pedal aperture and can be constructed from various materials or even combinations of materials such as metal or carbon fiber. The plurality of spacers each comprise a substantially non-deformable material and having a height to space apart the first and second plates at a predetermined distance when the plurality of spacers are disposed between the first and second plates. In one embodiment, the predetermined distance is substantially equivalent to the height of the spacers.

In accordance with a first aspect, the plurality of spacers are formed on either one or both of the first and second plates.

In accordance with a second aspect, the plurality of spacers are formed on the second plate.

In accordance with a third aspect, the plurality of spacers each comprises a base end, a terminal end, a side wall that tapers from the base end to the terminal end, and a bore through the base and terminal ends.

In accordance with a fourth aspect, the second plate further comprises a first flange disposed around at least a portion of the pedal aperture. The first flange comprises at least one opening in communication with the bore of at least one of the plurality of spacers.

In accordance with a fifth aspect, the cleat assembly further comprises an intermediate plate disposed between the first and second plates. The intermediate plate can be made of a deformable material such as plastic or a substantially non-deformable material such as metal alloy.

In accordance with a sixth aspect, the intermediate plate comprises a body and a second flange disposed around at least a portion of the body. The body defines a second pedal aperture. The second flange comprises at least one bore sized and configured to allow at least one of the plurality of spacers to pass through.

In accordance with a seventh aspect, at least a portion of the body of the intermediate plate is thicker than the second flange of the intermediate plate.

In accordance with an eighth aspect, the cleat assembly further comprises a cap disposed over at least a portion of the second plate.

In another embodiment, a cleat assembly configured to be releasably secured to a clipless bicycle pedal is described. The cleat assembly comprises a first plate and a second plate disposed over the first plate. The second plate defines a first pedal aperture having a circumferential periphery. The circumferential periphery comprises a first portion defining a first plane, and a side tie portion.

In accordance with a first aspect, the side tie portion is offset from the first plane.

In accordance with a second aspect, the first portion is in greater spaced relation to the first plate than the side tie portion.

In accordance with a third aspect, the cleat assembly further comprises an intermediate plate disposed between the first and second plates. Preferably, the intermediate plate comprises a body and a second flange disposed around at least a portion of the body. The thickness of at least a portion of the body of the intermediate plate is greater than the thickness of the second flange of the intermediate plate.

In accordance with a fourth aspect, the cleat assembly further comprises a plurality of spacers formed from the second plate and disposed between the first and second plates. The plurality of spacers each comprise a substantially non-deformable material and have a height to space apart the first and second plates at a predetermined distance. In a preferred embodiment, the predetermined distance is substantially equivalent to the height of the spacers. The plurality of spacers each comprises a base end, a terminal end, a side wall that tapers from the base end to the terminal end, and a bore through the base and terminal ends.

In accordance with a fifth aspect, the second plate further comprises a first flange disposed around at least a portion of the first pedal aperture. The first flange comprises at least one opening in communication with the bore of at least one of the spacers to receive at least one screw for securing the second plate and the first plate. The second flange of the intermediate plate comprises at least one bore sized and configured to allow at least one of the spacers to pass through.

In accordance with a sixth aspect, the cleat assembly further comprises a cap disposed over at least a portion of the second plate.

In a further embodiment, a cleat assembly configured to be releasably secured to a clipless bicycle pedal is provided. The cleat assembly comprises a first plate and a second plate disposed over the first plate. The second plate defines a first pedal aperture and comprises a peripheral edge having a first of an engagement pair. A cap comprises an external surface and an internal cavity. The cap is configured to house the second plate within the internal cavity, the cap comprising a second of the engagement pair. The first and second of the engagement pair removably couples the cap and the second plate. The first of the engagement pair comprises one of a plurality of grooves or a plurality of tongues. The second of the engagement pair comprises the other of the plurality of grooves or the plurality of tongues. These first and second engagement pairs provide more secure coupling and allow the cap to better resist accidental disengagement from the second plate while the user is walking about on the ground (e.g., due to twisting or pivoting of the user's foot).

In accordance with a first aspect, the cleat assembly further comprises a plurality of spacers formed on the second plate and is configured to be disposed between the first and second plates. The spacers each preferably comprises a substantially non-deformable material and has a height to space apart the first and second plates at a predetermined distance. An intermediate plate is disposed between the first and second plates, the intermediate plate having a body defining a second pedal aperture and a second flange disposed around at least a portion of the second pedal aperture. The second flange comprises at least one bore sized and configured to allow at least one of the plurality of spacers disposed between the first and second plates to pass through. At least a portion of the body of the intermediate plate is thicker than the second flange of the intermediate plate. The second plate further comprises a first flange disposed around at least a portion of the first pedal aperture, the first flange comprising at least one opening in communication with the bore of the plurality of spacers to receive at least one screw for securing the second plate and the first plate. The plurality of spacers comprise a base end, a terminal end, a side wall that tapers from the base end to the terminal end, and a bore through the base and terminal ends.

In accordance with a second aspect, the first pedal aperture of the second plate comprises a circumferential periphery comprising a first portion defining a first plane and a side tie portion. The side tie portion is offset from the first plane and wherein the first portion is in greater spaced relation to the first plate than the side tie portion.

Other features and advantages of the present invention should become apparent from the following description of the preferred embodiments, taken in conjunction with the accompanying drawings, which illustrate, by way of example, the principles of the invention.

DESCRIPTION OF THE PREFERRED EMBODIMENTS

Figure 1:
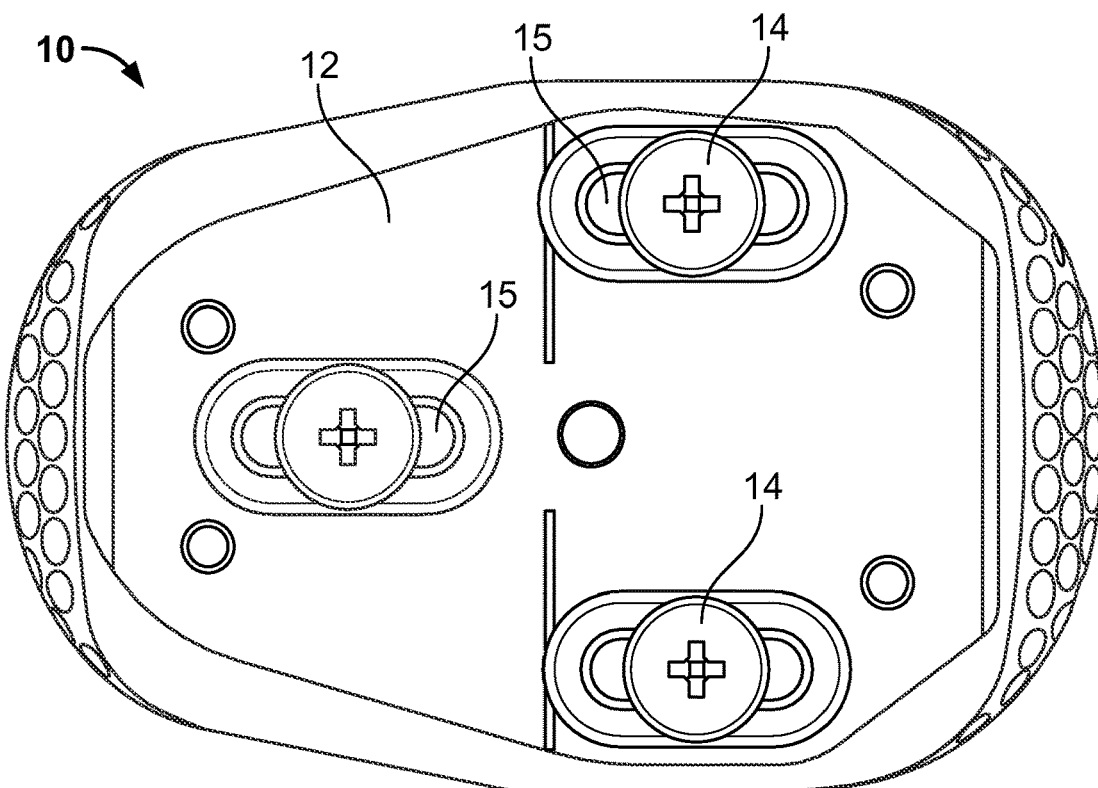
FIG. 1 is a top plan view of the first plate of an embodiment of the cleat assembly in accordance with the invention.
Figure 2:
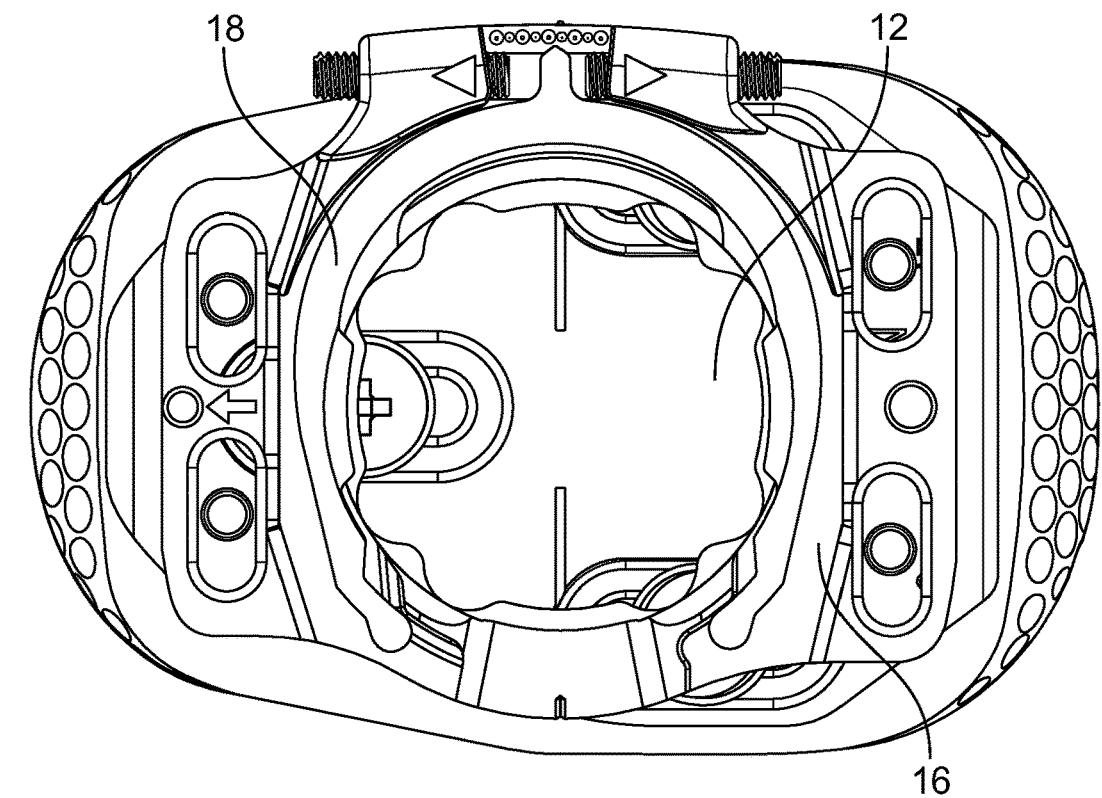
FIG. 2 is a top plan view of the first plate and the intermediate plate of an embodiment of the cleat assembly in accordance with the invention.
Figure 3:
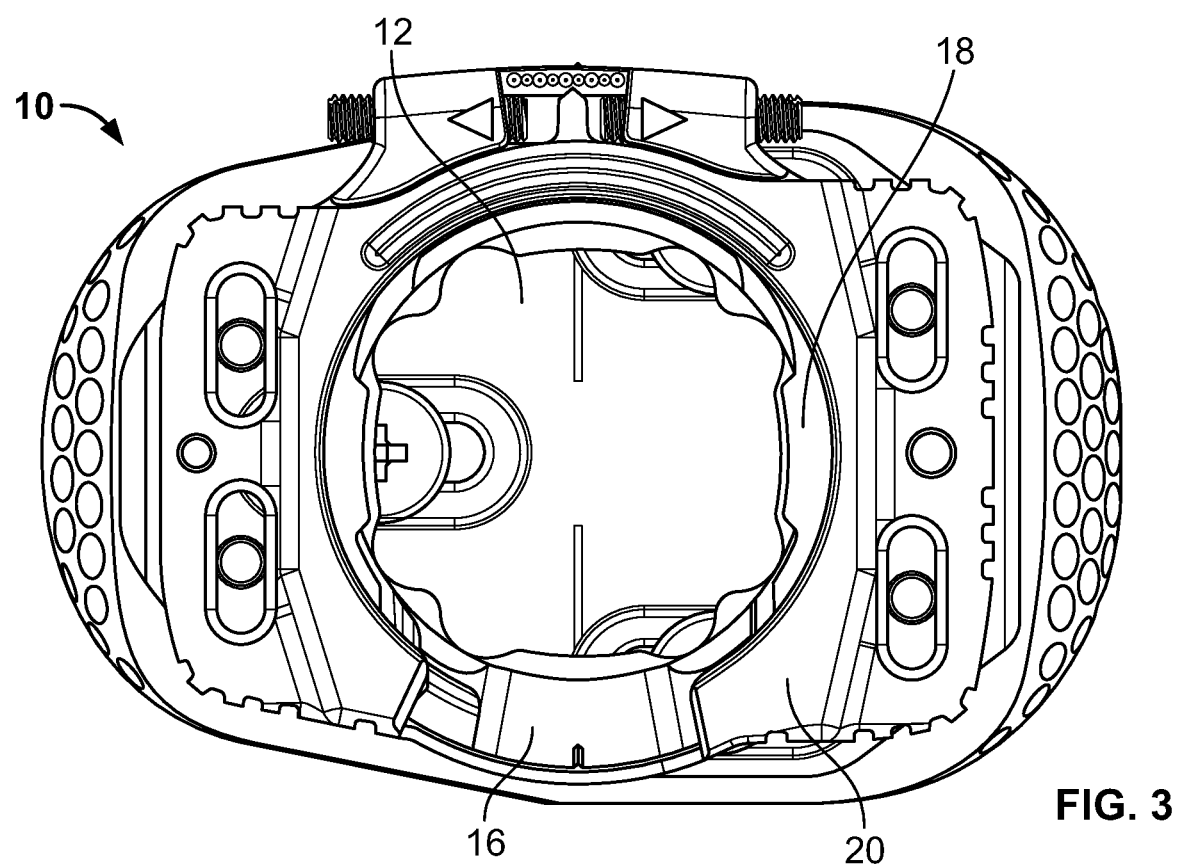
FIG. 3 is a top plan view of the first plate, the intermediate plate, and the second plate of an embodiment of the cleat assembly in accordance with the invention.
Figure 10:
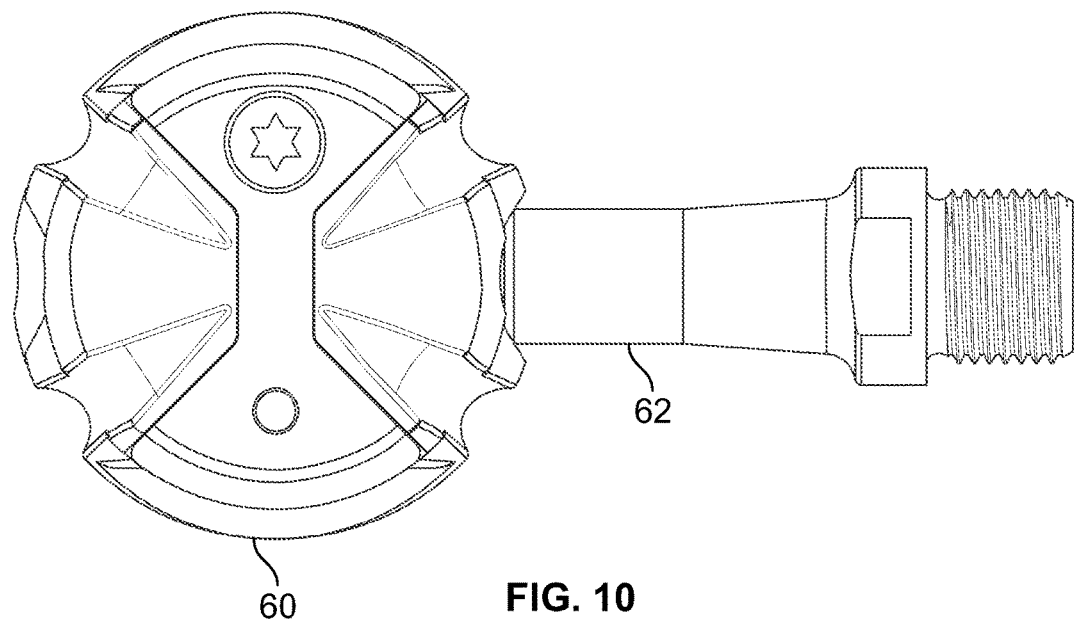
FIG. 10 is a top plan view of an embodiment of a clipless bicycle pedal with which the cleat assembly can be used.

With reference now to the illustrative drawings, and particularly to FIGS. 1-3, there is shown an embodiment of a cleat assembly 10 in accordance with the invention, configured for attachment to the sole of a user's shoe (not shown) and for releasable securement to a bicycle pedal 60 (FIG. 10). The particular cleat assembly depicted is configured for attachment to the user's left shoe, but it will be appreciated that a similar cleat assembly could be oppositely configured for attachment to the user's right shoe. The clipless bicycle cleat assembly includes a first plate 12, an intermediate plate 16, and a second plate 20. The first plate is configured to be secured to the shoe's sole (not shown) by screws 14 extending through three elongated openings 15. In one embodiment, the first and intermediate plates are made of plastic and the second plate is made of a metallic material.

Figure 4A:
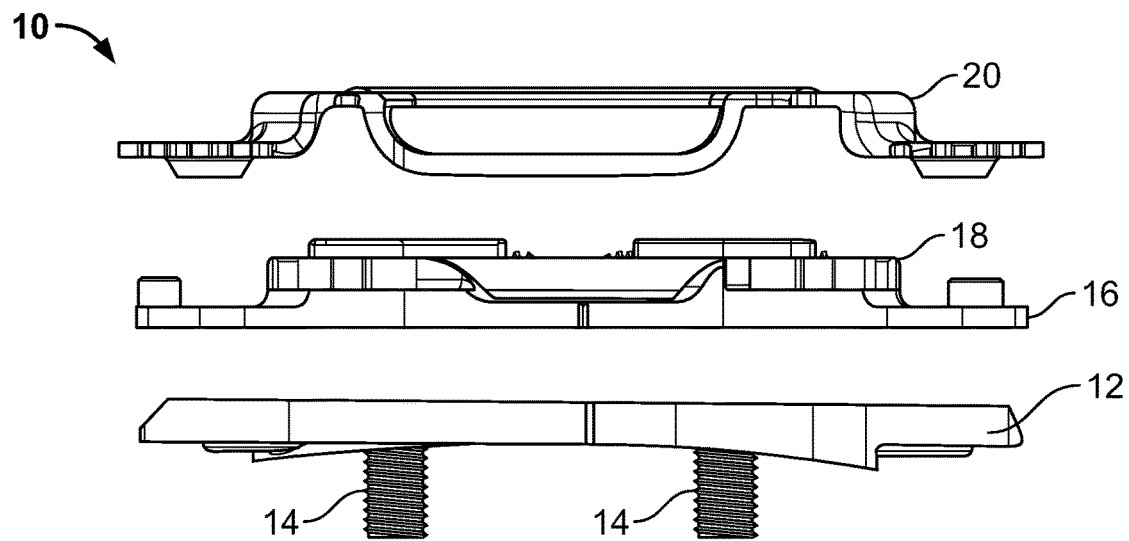
FIG. 4A is an exploded side elevational view of the first plate, the intermediate plate, the second plate of an embodiment of a cleat assembly in accordance with the invention.
Figure 4B:
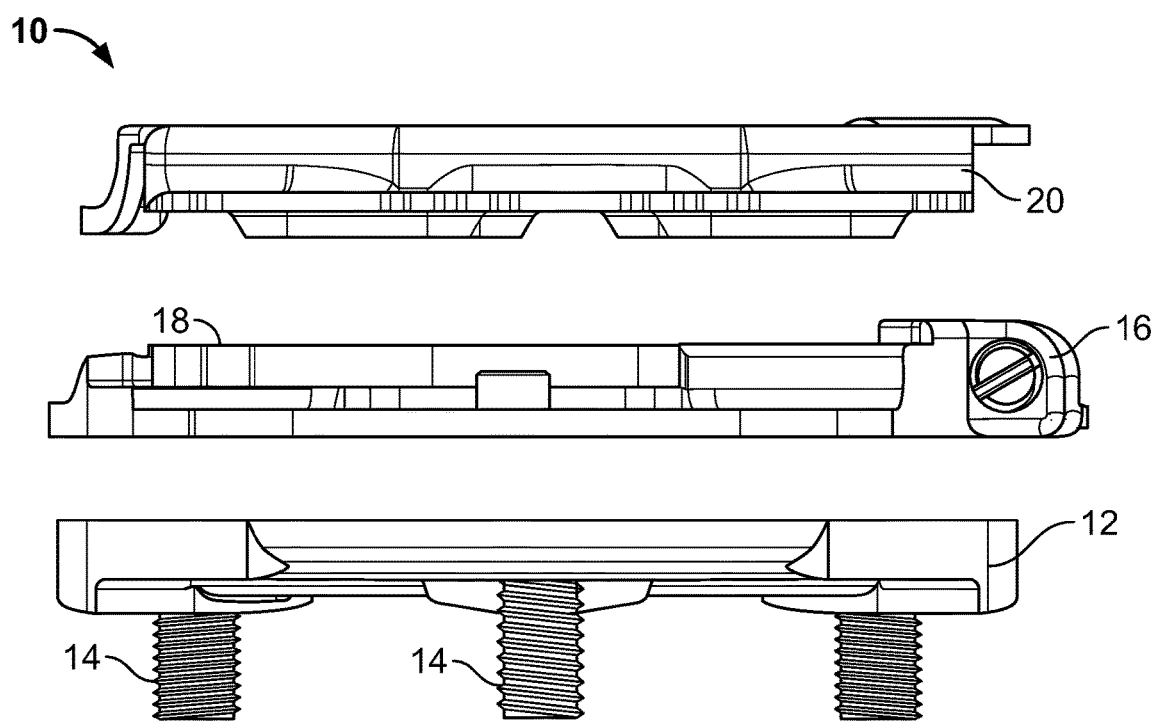
FIG. 4B is an exploded side elevational view of the three plates of the embodiment of the cleat assembly depicted in FIG. 1, the plates being rotated clockwise 90°.

More particularly, as illustrated in FIGS. 4A and 4B, the intermediate plate 16 and second plate 20, together, are configured to be secured to the first plate 12. A spring clip 18 is mounted between the intermediate plate and the second plate (see also FIGS. 2, 3), for releasably engaging the pedal when the cleat assembly is positioned over the bicycle pedal 60 (FIG. 10). It should be noted that engagement mechanisms other than a spring clip can be used to releasably engage the cleat assembly to the pedal.

Figure 5:
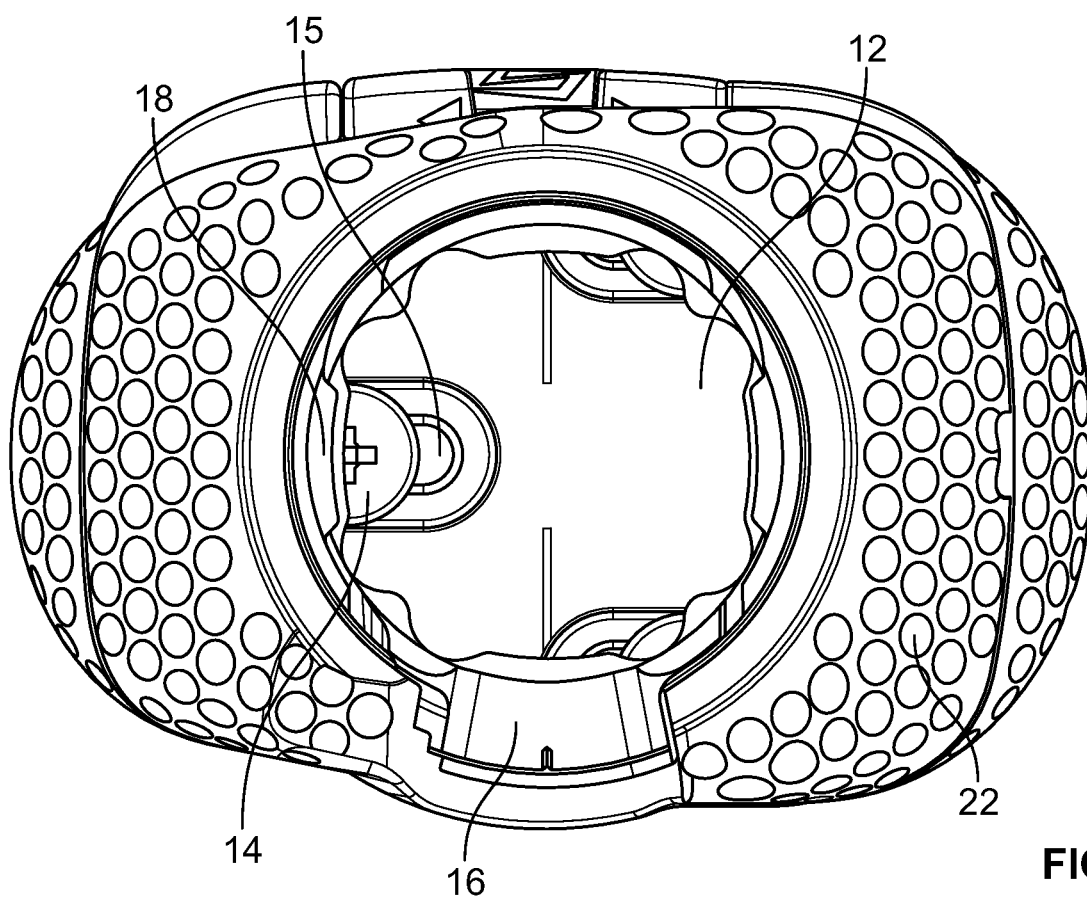
FIG. 5 is a top plan view of the first plate, the intermediate plate, the second plate, and the elastomeric cap of an embodiment of the cleat assembly in accordance with the invention.

With reference now to FIG. 5, there is shown an embodiment of a clipless bicycle cleat assembly 10 in accordance with the invention, that includes a cap 22. The cap overlays the second plate 20. The cap is sized to project slightly above the exposed surface of the second plate, and the exposed edges of the cap are rounded. The second plate thereby is slightly recessed from the cap, such that only the cap engages the ground when the user walks about. Preferably, the cap is formed of a molded elastomeric material such as polyurethane, to provide improved frictional engagement with the ground and thereby to make walking more comfortable for the user. In existing cleat assemblies lacking a cap, when the cleat assembly is disengaged from a pedal and the user is walking about on the ground, the second plate is in direct engagement with the ground requiring the user to use care when walking about. This direct engagement also has led to undesired wear of the second plate. Additionally, in cleat assemblies having a metallic second plate, the user must be careful not to scratch the pedal when engaging the cleat assembly to the pedal. In the current embodiment, the cap addresses these issues. In addition, if the cap becomes unduly worn from substantial walking, it can be readily replaced. The cap's rounded shape also improves the cleat's aerodynamic properties.

Figure 6:
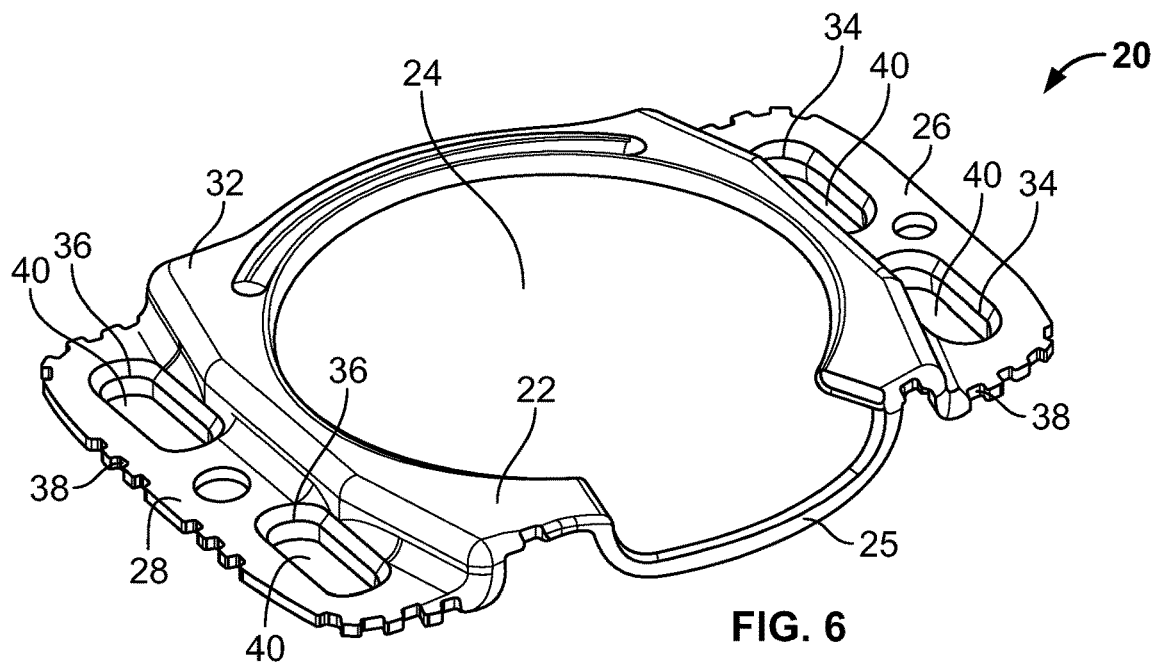
FIG. 6 is a perspective view of the topside of the second plate of an embodiment of the cleat assembly in accordance with the invention.

With reference now to FIG. 6, there is shown the second plate 20 of an embodiment of the clipless bicycle cleat assembly 10 in accordance with the invention. The second plate includes a body 22 defining a portion of a first pedal aperture 24, the first pedal aperture being sized and configured to receive the clipless bicycle pedal 60 (FIG. 10). The second plate also includes a forward flange 26 and rearward flange 28, top surface 30 (FIG. 8D) and a bottom surface 32. The forward flange of the second plate includes two spacers 34 each having a central bore 40 that extends through the forward flange. Similarly, the rearward flange of the second plate includes two spacers 36 each having a central bore 40 that extends through the rearward flange. The second plate of the embodiment also includes a side tie 25 defining a portion of the circumference of the first pedal aperture wherein the circumference of the first pedal aperture is fully enclosed. The side tie of the embodiment forms a U-shaped structure wherein the side tie curves away from the plane defined by the second plate's body and in the direction of the first plate (FIG. 7C). The curvature of the side tie is provided to accommodate the shaft 62 of the bicycle pedal 60 (FIG. 10) when the clipless bicycle cleat assembly is releasably secured to the bicycle pedal. The side tie serves to increase the rigidity and strength of the clipless bicycle cleat assembly compared to a cleat assembly having a pedal aperture the circumference of which is only partially enclosed.

Figure 7:
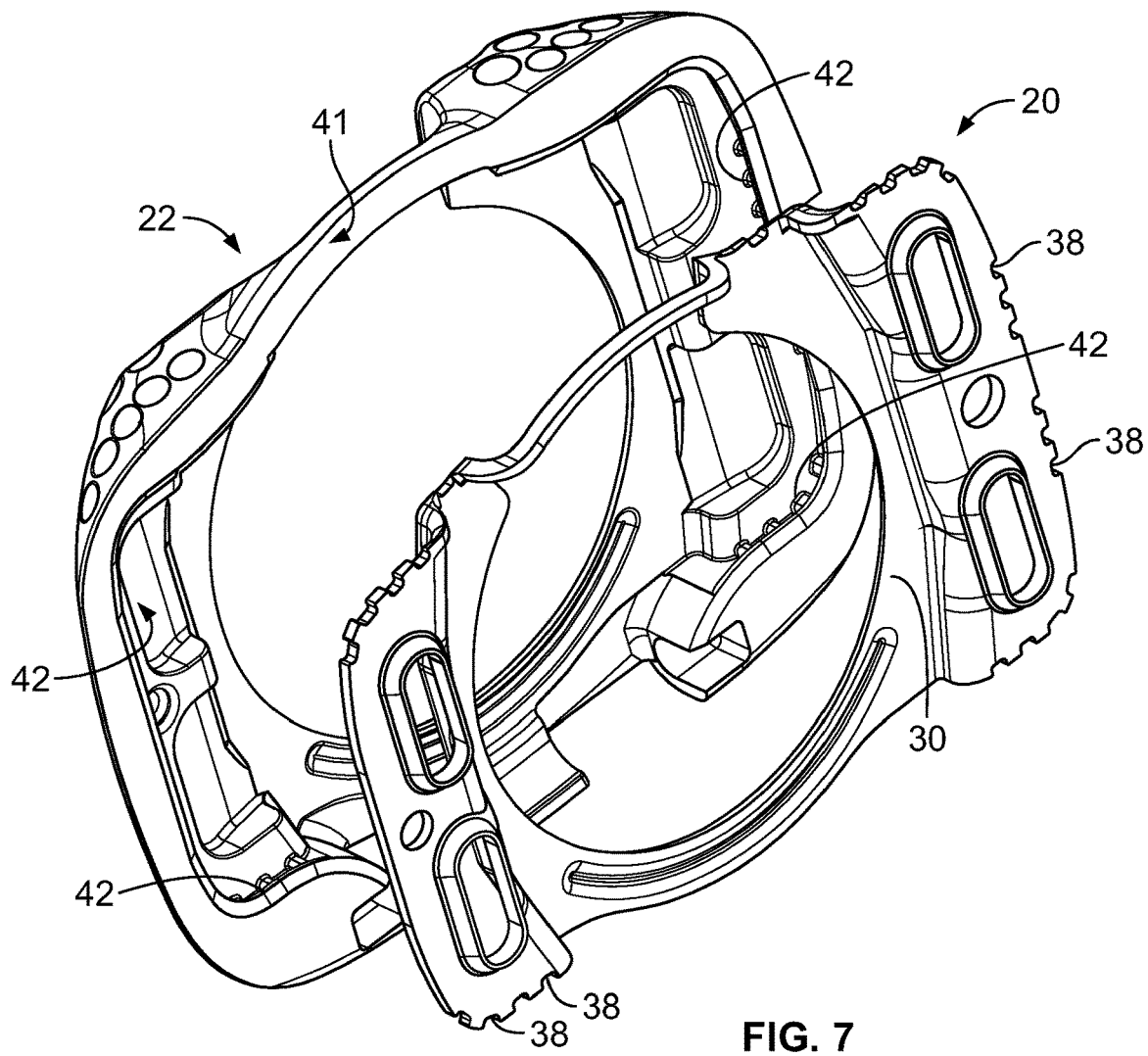
FIG. 7 is a perspective view of the second plate and the elastomeric cap of an embodiment of the cleat assembly in accordance with the invention.

With reference now to FIG. 7, there is shown the second plate 20 of an embodiment of the clipless bicycle cleat assembly 10 in accordance with the invention. The second plate's forward and rearward flanges each also has an outer edge forming a plurality of vertical grooves 38. A cap 22 can be disposed over at least part of the bottom surface of the second plate. In this embodiment, the cap comprises a molded elastomeric material and has a top surface 40 comprising a plurality of tongues 42 corresponding to the plurality of vertical grooves 38 formed in the forward and rearward flanges of the second plate.

Figure 8A:
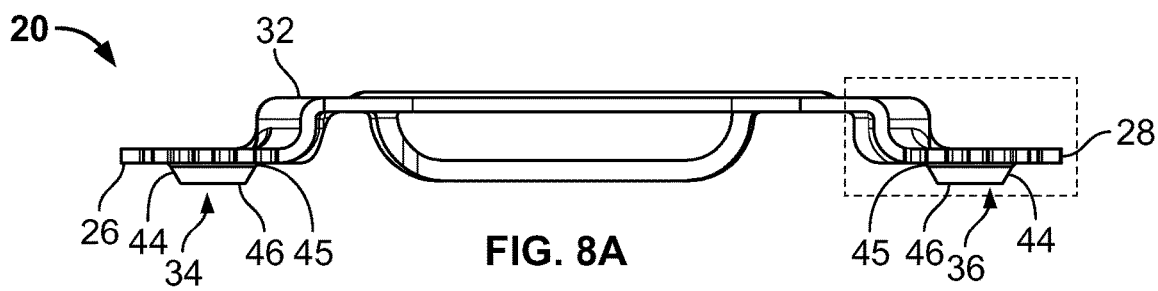
FIG. 8A is a side elevational view of the first plate of an embodiment of the cleat assembly in accordance with the invention.
Figure 8B:
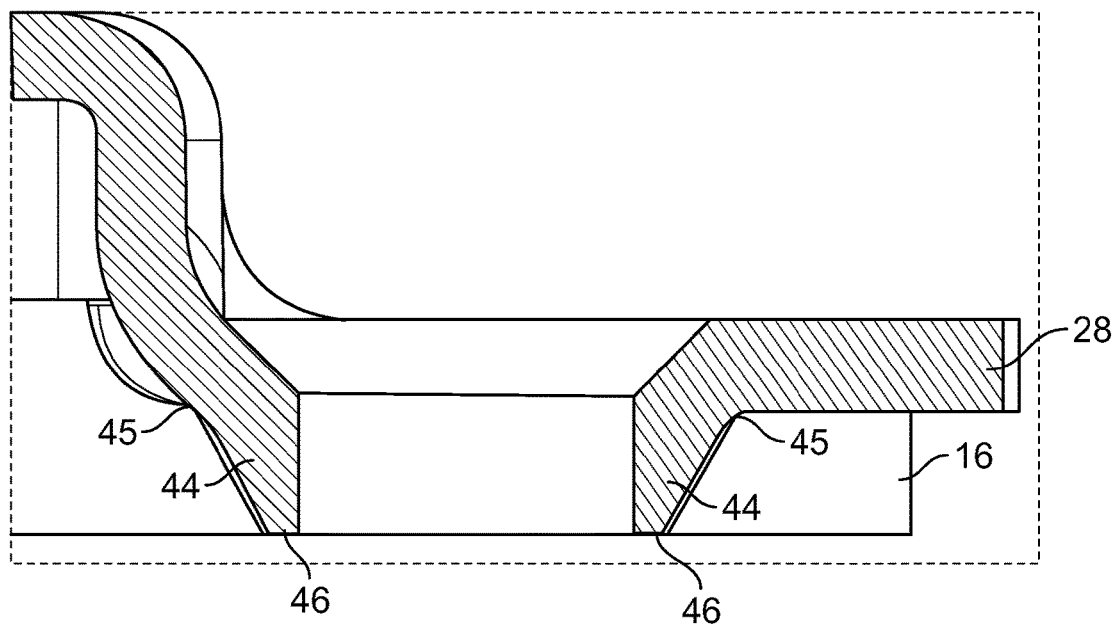
FIG. 8B is a close-up cross sectional view of a portion of the second plate and a portion of the intermediate plate of an embodiment of the cleat assembly in accordance with the invention.
Figure 8C:
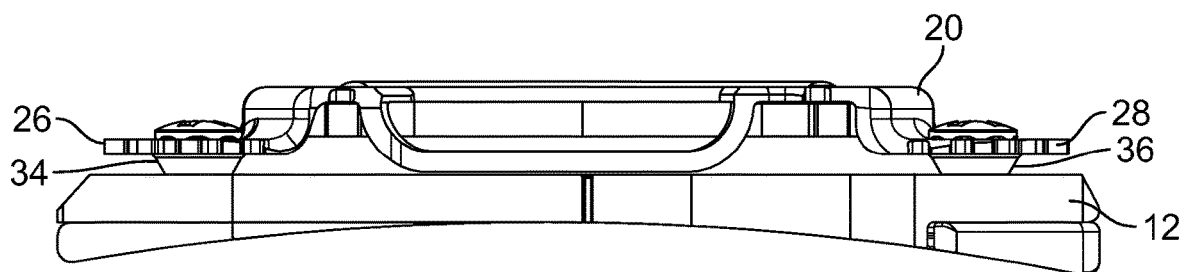
FIG. 8C is a side elevational view of the second plate coupled to the first plate of an embodiment of the cleat assembly in accordance with the invention.
Figure 8D:
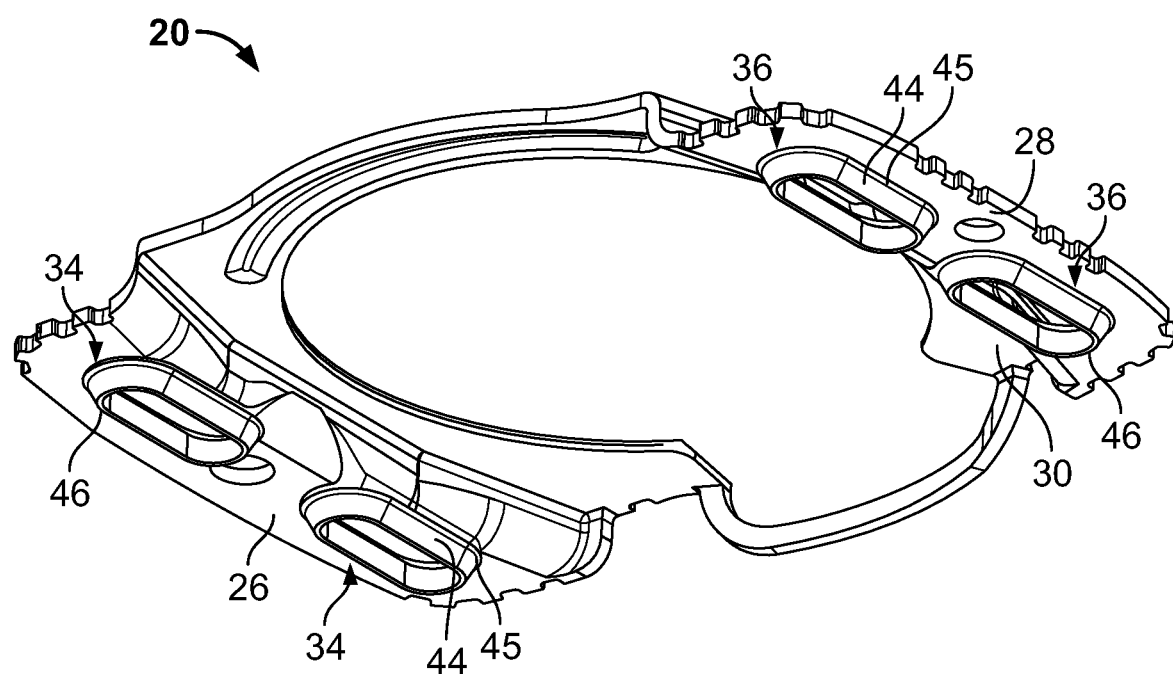
FIG. 8D is a perspective view of the underside of the second plate of an embodiment of the cleat assembly in accordance with the invention.

With reference now to FIGS. 8A-8D, there is shown the second plate 20 of an embodiment of the clipless bicycle cleat assembly 10 in accordance with the invention. The top surface 30 of the forward flange 26 forms two spacers 34. The top surface of the rearward flange 28 forms two spacers 36. As noted above, each of the spacers has a central bore 40 extending through the forward and rearward flanges (FIGS. 6A and 6B). Each of the spacers also has a sidewall 44, a base end 45 and a terminal end 46. The sidewalls of each of the spacers of this embodiment are tapered from the base end toward the terminal end. The terminal ends of the spacers abut the first plate 12 when the second plate is coupled to the first plate and, therefore, the length of the second plate's spacers define a space between the first plate and the second plate when the clipless bicycle cleat assembly is assembled (FIG. 8C). In the present embodiment, the intermediate plate 16 is made of plastic. The spacers serve to provide a rigid support to avoid deformation (also known as "creep") of the intermediate plate when the attachment screws are tightened. The intermediate plate can also serve as a spring housing. Without the spacers, tightening of screws attaching the first plate to the second plate can deform the intermediate plate and, as a result, restricted free flexing movement of the spring clip 18 that can be contained within the intermediate plate (FIG. 18). Restricting the free flexing movement of the spring clip can make it more difficult to engage or disengage the spring clip to/from the pedal.

Figure 9:
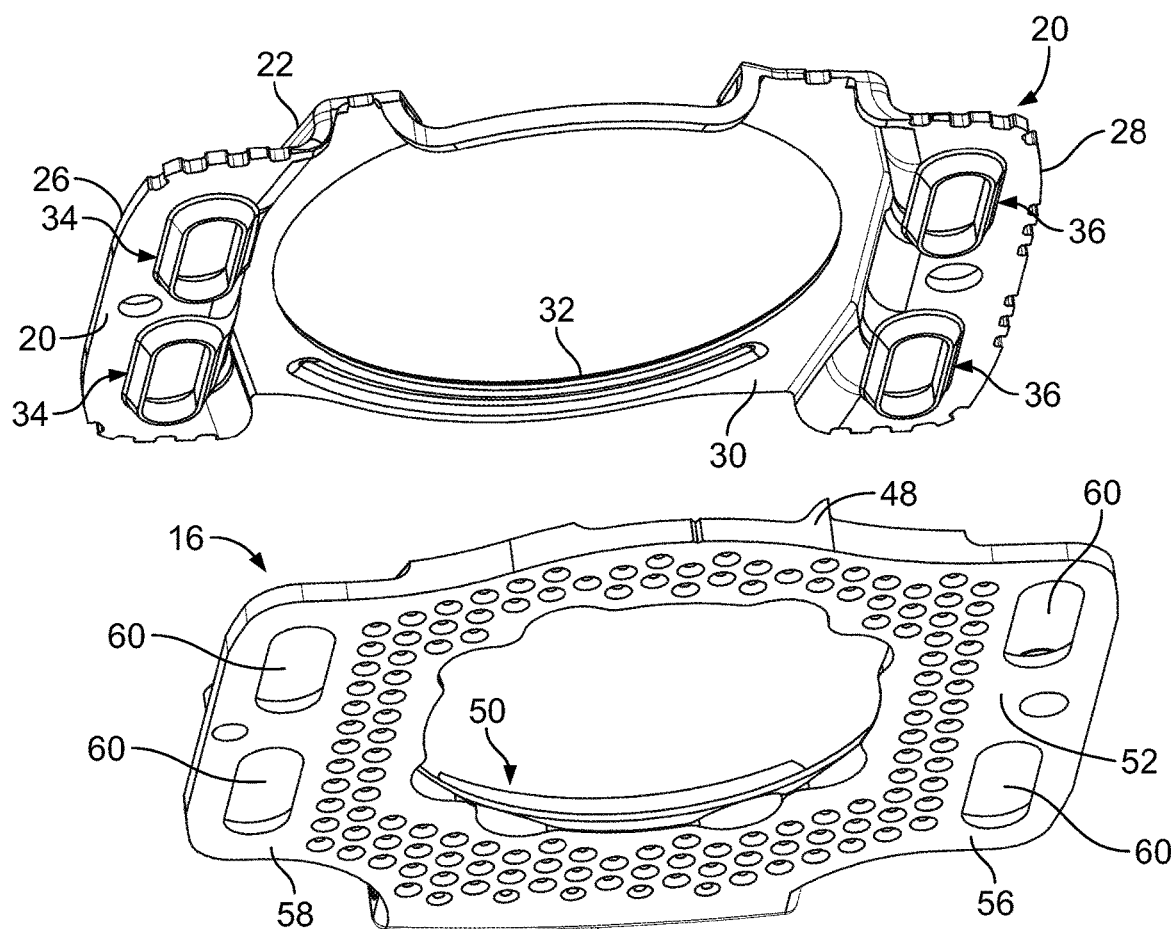
FIG. 9 is perspective view of the underside of the intermediate plate and the second plate of an embodiment of the cleat assembly in accordance with the invention.

With reference now to FIG. 9, there is shown the second plate 20 and intermediate plate 16 of an embodiment of the clipless bicycle cleat assembly 10 in accordance with the invention. The intermediate plate has a body 48 generally aligned with the body 22 of the second plate and defining a second pedal aperture 50 generally aligned with the first pedal aperture 24 of the second plate, the second pedal aperture 50 being sized and configured to receive the clipless bicycle pedal. The intermediate plate also includes a top surface 52, a bottom surface 54, and forward and rearward flanges 56, 58. The forward and rearward flanges of the intermediate plate generally align with the forward and rearward flanges 26, 28 of the second plate respectively when the cleat assembly is assembled. The forward and rearward flanges of the intermediate plate each defines two bores 60 sized and configured to receive the spacers 34, 36 on the second plate's forward flange 26 and rearward flange 28 respectively when the cleat assembly is assembled. The top surface 30 of the forward and rearward flanges of the second plate abuts the bottom surface of the forward and rearward flanges of intermediate plate respectively when the cleat assembly is assembled. Having an intermediate layer that extends to at least encompass the spacers on the second plate's flanges serves to increase the stiffness of the cleat assembly and, as previously discussed, the spacers prevent deformation of the intermediate plate when the attachment screws are tightened. Additionally, at least a portion of the intermediate plate's body is thicker than the forward and rearward flanges. Decreasing the thickness of the intermediate plate in the region of the spacers serves to further reduce deformation of the intermediate layer due to applied clamp force when the attachment screws are tightened. This arrangement also results in a cleat assembly that is easier to walk in and that is more aerodynamic.

With reference now to FIG. 10, there is shown an embodiment of a clipless bicycle pedal 60 with which the cleat assembly can be used.

Although the invention has been described in detail with reference only to the presently preferred embodiments, those skilled in the art will appreciate that various modifications can be made without departing from the invention. Accordingly, the invention is defined only by the following claims.

I claim:

1. A cleat assembly configured to be releasably secured to a clipless bicycle pedal, the cleat assembly comprising:
a first plate;
a metallic second plate disposed over the first plate, the second plate defining a fully enclosed first pedal aperture having a circumferential periphery;
an intermediate plate disposed between the first plate and the second plate;
a plurality of metallic spacers configured to be disposed between the first and second plates, each of the plurality of spacers having a height to space apart the first and second plates at a predetermined distance when the plurality of spacers are disposed between the first and second plates; and
at least one screw securing the second plate over the intermediate plate to the first plate;
wherein the second plate comprises
a forward flange disposed forwardly of the first pedal aperture, and
a rearward flange disposed rearwardly of the first pedal aperture;
wherein the circumferential periphery of the fully enclosed first pedal aperture comprises
a first portion defining a plane, and
a side tie portion curving away from the first portion toward the first plate;
wherein the side tie portion forms a U-shaped structure extending from the plane and separated from the forward and rearward flanges;
wherein at least one of the plurality of spacers has a bore extending therethrough; and
wherein the at least one screw extends through the bore of the at least one of the plurality of spacers and applies an immobilizing force to the intermediate plate, the immobilizing force being sufficient to inhibit the intermediate plate from moving with respect to the first plate.

2. The cleat assembly of claim 1, wherein the plurality of spacers are formed on the second plate.

3. The cleat assembly of claim 2, wherein each of the plurality of spacers comprises a base end, a terminal end, and a side wall that tapers from the base end to the terminal end.

4. The cleat assembly of claim 3, wherein each of the forward flange and the first rearward flange comprises at least one opening in communication with the bore of at least one of the plurality of spacers.

5. The cleat assembly of claim 4, wherein the intermediate plate comprises:
a body; and
a flange disposed around at least a portion of the body;
wherein the body defines a second pedal aperture; and
wherein the flange of the intermediate plate comprises at least one bore sized and configured to allow at least one of the plurality of spacers to pass through.

6. The cleat assembly of claim 5, wherein at least a portion of the body of the intermediate plate is thicker than the flange of the intermediate plate.

7. The cleat assembly of claim 1, further comprising a cap defining a third pedal aperture generally aligned with the first pedal aperture, the cap disposed over at least a portion of the second plate.

8. The cleat assembly of claim 7, wherein each of the plurality of spacers comprises a metallic alloy.

9. The cleat assembly of claim 1, wherein each of the plurality of spacers comprises an uninterrupted side wall that surrounds the bore.

10. A cleat assembly configured to be releasably secured to a clipless bicycle pedal, the cleat assembly comprising:
a first plate;
a metallic second plate disposed over the first plate, the second plate defining a fully enclosed first pedal aperture having a circumferential periphery, the circumferential periphery comprising a first portion defining a plane, and a side tie portion curving away from the first portion toward the first plate, wherein the side tie portion imparts rigidity to the second plate;
an intermediate plate disposed between the first plate and the second plate;
a plurality of metallic spacers formed on the second plate and disposed between the first and second plates, each of the plurality of spacers having a height to space apart the first and second plates at a predetermined distance; and
at least one screw securing the second plate over the intermediate plate to the first plate;
wherein the second plate comprises
a forward flange disposed forwardly of the first pedal aperture, and
a rearward flange disposed rearwardly of the first pedal aperture;
wherein the side tie portion forms a U-shaped structure extending from the plane and separated from the forward and rearward flanges;
wherein at least one of the plurality of spacers has a bore extending therethrough; and
wherein the at least one screw extends through the bore of the at least one of the plurality of spacers and applies an immobilizing force to the intermediate plate, the immobilizing force being sufficient to inhibit the intermediate plate from moving with respect to the first plate.

11. The cleat assembly of claim 10, wherein the side tie portion is offset from the plane.

12. The cleat assembly of claim 11, wherein the first portion is in greater spaced relation to the first plate than the side tie portion.

13. The cleat assembly of claim 12, wherein the intermediate plate comprises:
a body; and
a first flange disposed around at least a portion of the body,
wherein a thickness of at least a portion of the body of the intermediate plate is greater than a thickness of the first flange of the intermediate plate.

14. The cleat assembly of claim 13, wherein:
each of the plurality of spacers comprises a base end, a terminal end, and a side wall that tapers from the base end to the terminal end; and
for each of the at least one of the plurality of spacers having a bore extending therethrough, the bore extends through the base and terminal ends.

15. The cleat assembly of claim 14, wherein:
each of the forward flange and the rearward flange comprises at least one opening in communication with the bore of at least one of the plurality of spacers to receive the at least one screw for securing the second plate over the intermediate plate to the first plate; and
the first flange of the intermediate plate comprises at least one bore sized and configured to allow at least one of the plurality of spacers to pass through.

16. The cleat assembly of claim 10, further comprising a cap defining a third pedal aperture generally aligned with the first pedal aperture, the cap disposed over at least a portion of the second plate.

17. The cleat assembly of claim 10, wherein each of the plurality of spacers comprises an uninterrupted side wall that surrounds the bore.

\* \* \* \* \*